United States Patent [19]

Mort et al.

[11] Patent Number: 5,178,980

[45] Date of Patent: Jan. 12, 1993

[54] PHOTOCONDUCTIVE IMAGING MEMBERS WITH A FULLERENE COMPOUND

[75] Inventors: Joseph Mort; Mary A. Machonkin, both of Webster, N.Y.

[73] Assignee: Xerox Corporation, Stamford, Conn.

[21] Appl. No.: 754,089

[22] Filed: Sep. 3, 1991

[51] Int. Cl.$^5$ ............................................. G03G 5/06
[52] U.S. Cl. ..................................... 430/58; 430/59; 430/71; 430/126
[58] Field of Search ................... 430/56, 58, 59, 71, 430/126

[56] References Cited

U.S. PATENT DOCUMENTS

| | | | |
|---|---|---|---|
| 4,922,827 | 5/1990 | Remo | 102/496 |
| 5,114,477 | 5/1992 | Mort et al. | 106/20 |

OTHER PUBLICATIONS

Time Magazine, "Great Balls of Carbon", J. M. Nash, May 6, 1991, p. 66.
Science, "Bulky Balls, Hairy Balls, Dopey Balls", vol. 252, Apr. 12, 1991, p. 646.
Nature, "Solid $C_6O$: A New Form of Carbon", W. Kratschmer et al., vol. 347, Sep. 27, 1990, pp. 354 $\propto$ 358.
Chemical & Engineering News, "Simple Synthesis of $C_6O$ Molecule Triggers Intense Research Effort", R. M. Baum, Oct. 29, 1990, pp. 22–25.

*Primary Examiner*—Roland Martin
*Attorney, Agent, or Firm*—E. O. Palazzo

[57] ABSTRACT

An imaging member comprised of a supporting substrate, a photogenerator layer optionally dispersed in a resin binder, and a charge transport layer comprised of a fullerene or fullerenes optionally dispersed in a resin binder.

36 Claims, 2 Drawing Sheets

PHOTOCONDUCTIVE IMAGING MEMBERS WITH A FULLERENE COMPOUND

BACKGROUND OF THE INVENTION

This invention is generally directed to imaging members and more specifically the present invention is directed to layered photoconductive imaging members. In one embodiment of the present invention, the imaging members are comprised of a supporting substrate, a photogenerating layer and a charge transport layer comprised of any one of the fullerenes, such as buckminsterfullerene, giant fullerenes or mixtures thereof optionally dispersed in a resin binder. There are also provided in accordance with the present invention imaging members comprised of a supporting substrate, a photogenerating layer comprised of any one of the fullernes, such as buckminsterfullerene, giant fullerenes or mixtures thereof optionally dispersed in a resin binder and a charge transport layer. The imaging members of the present invention are useful in electrostatographic imaging systems, especially xerographic imaging and printing processes.

Advantages associated with the present invention in embodiments thereof, and especially when the charge transport is comprised of a fullerene include, for example, the economical noncomplex preparation of photoconductive imaging members in the form of vacuum sublimed layers without any decomposition or degradation of the fullerene molecular structure since it is believed that the fullerenes possess both physical, photochemical and photophysical stability. Also, the very high symmetry of the $C_{60}$ molecule, for example, as compared with the planar or one-dimensional structure of many known organic sensitizing or transport molecules diminishes the influence of steric or orientational effects on molecular wave function overlap in the resulting imaging member. This offers additional latitude in achieving and maintaining the optimum sensitizing and charge transport efficiency. For imaging applications, photosensitivites (number of carriers produced per absorbed photon) should preferably be unity, although values between 0.1 and 1.0 can be useful; for electrophotographic purposes the charge transport efficiency should be such that the distance a carrier can move per unit field, the so called $\mu\tau$ product should be $\geq 10^{-6}$ cm$^2$/volts. Additionally, the cage structure of the fullerenes offers considerable scope for the achievement and production of designer molecules to achieve these desirable ranges of electronic transport and spectral sensitivity and solubility in solvents and matrices up to the desired range of 20 to 40 percent by weight through the chemical attachment of appropriate molecular chromophores, or electronically active molecules, such as aryl amines, to the basic fullerene molecule.

Molecular fullerenes have been described as entirely closed, hollow spheroidal shells of carbon atoms containing 32 to 1,000 or more carbon atoms in each sphere, reference Smalley, R. E. "Supersonic Carbon Cluster Beams in Atomic and Molecular Clusters", Bernstein, E. R.; and *Physical and Theoretical Chemistry*, Vol. 68, Elsevier Science: New York, 1990; pages 1 to 68, the disclosures of which are totally incorporated herein by reference. The prototypical fullerene, $C_{60}$, has been referred to as buckminsterfullerene and has the molecular geometry of a truncated icosahedron, thus the $C_{60}$ molecules resemble a molecular sized soccer ball, reference *Time Magazine*, May 6, 1991, page 66, and *Science*, vol. 252, Apr. 2, 1991, page 646, the disclosures of which are totally incorporated herein by reference. Molecules of $C_{60}$, $C_{70}$ and of other fullerenes have also been referred to as buckyballs. Buckminsterfullerenes are usually comprised of $C_{60}$ molecules contaminated with small amounts of $C_{70}$ and possibly $C_{84}$ molecules or even smaller amounts of higher molecular weight fullerene molecules. The preparation of buckminsterfullerene and of other fullerenes from the contact arc vaporization of graphite and a number of the buckminsterfullerene characteristics, such as solubility, crystallinity, color and the like, have been described in Kratschmer, W., Lamb, L. D., Fostiropoulos, K., Huffman, D. R. *Nature*, 1990, Vol. 347, pages 354 to 358 and in *Chemical and Engineering News*, Oct. 29, 1990, pages 22 to 25, the disclosures of which are totally incorporated herein by reference. The fullerenes are available from Texas Fullerenes Corporation, 2415 Shakespeare Suite 5, Houston, Tex. 77030-1038, Materials and Electrochemical Research (MER) Corporation, 7960 South Kolb Road, Tucson, Ariz. 85706, and Research Materials, Inc., 1667 Cole Boulevard, Golden, Colo. 80401, and are believed to be comprised of mainly $C_{60}$ and smaller amounts of $C_{70}$ and $C_{84}$ carbon molecules, and possible small amounts of other higher molecular weight fullerenes. It is believed that these new forms of carbon possess a number of advantages for electrophotographic applications, including, for example, their solubility in organic solvents. The other known carbon forms, diamond and graphite and derivatives thereof, are not considered to be soluble in such solvents. Solubility in organic solvents enables improved processing and the economical preparation of compositions wherein the optical density is considered low since the fullerenes are of different colors and are of substantially lower optical density than ordinary carbon black. Allotropic forms of carbon comprised of spherical assemblies of carbon atoms $C_n$ with, for example, n being the number 60, 70, 84, and the like are considered fullerenes and can be formed as powders by the evaporation of graphite in inert noble gas atmospheres with arcs or lasers, and these fullerenes are available from the sources mentioned herein. The color of the allotrope can depend on the value of n, for example when n is equal to 70 the color is orange, when n is equal to 84 the color is purple magenta, and when n is equal to 60 the color is yellow.

There was submitted in July 1991 to *Nature*, 1137 National Press Building Washington, D.C. 20045 for review by a referee and for later possible publication, the disclosure of which is totally incorporated herein by reference, a letter of which the following is a summary thereof. Reports exist on the electrical properties of $C_{60}$ and $C_{70}$ films doped with alkali metals, including the observation of superconductivity. Undoped films are insulators and yet have significant visible absorption. We report photoeffects in the visible and near-infrared spectrum in sublimed films of $C_{60/70}$. The peak photoefficiency (photocarrier per absorbed photon) is $\sim 10^{-4}$. Since for wavelengths $>7,000$ Å, absorption in $C_{60/70}$ films is very weak, carrier photoinjection from the electrodes into the conduction states of $C_{60/70}$ must be considered. Evidence, based on the energy level structure of $C_{60}$ films is discussed which suggests this may not be the source of the photocurrents. Alternatively, the observed threshold may be the photoconductive edge associated with the reported weak absorption due to forbidden transitions in the lowest direct bandgap, which recent calculations place at 1.5 electron volts. The samples were deposited on glass slides, partially precoated with evaporated aluminum electrodes, by vacuum sublimation of $C_{60/70}$ prepared as previously described. The ratio of $C_{70}$ to $C_{60}$ in the source material was ~0.1. We have assumed that the controlling molecule in the films is $C_{60}$, although $C_{70}$ may also play a significant role. Sandwich cells were completed by evaporating semitransparent, top electrodes (area 0.3 $cm^2$) for which gold or aluminum were used. The sandwich cell geometry, in which the current flow is perpendicular to the plane of the film, minimizes the possible complications of more conductive surface layers which, if present, can dominate surface cell measurements. In addition, the films were of sufficient thickness, 1.5 $\mu m$, to avoid shorting due to discontinuities or pinholes and yet allowed sufficiently high fields to be applied to increase the possibility of detecting photoconductivity. Dark conductivity measurements made on these samples have established that the room temperature dark conductivity is $\sim 10^{-14} (\Omega cm)^{-1}$, and that the dark current versus voltage curves are linear for applied voltages less than 2 volts. For the photoeffect measurements, a xenon discharge lamp in combination with isolation filters was employed to achieve the requisite higher light intensities than achievable with a monochromator.

Layered photoconductive imaging members with charge generating and charge transport layers are known, reference for example U.S. Pat. No. 4,265,990, the disclosure of which is totally incorporated herein by reference. Photoreceptor materials comprising inorganic or organic materials wherein the charge generating and charge transport functions are performed by discrete contiguous layers are known. Additionally, layered photoreceptor members are disclosed in the prior art, including photoreceptors having an overcoat layer of an electrically insulating polymeric material. Photoresponsive materials containing a hole injecting layer overcoated with a hole transport layer, followed by an overcoating of a photogenerating layer, and a top coating of an insulating organic resin, are disclosed in U.S. Pat. No. 4,251,612, the disclosure of which is totally incorporated herein by reference. Examples of photogenerating layers disclosed in these patents include trigonal selenium and phthalocyanines, while examples of transport layers include certain aryl diamines as illustrated therein.

In addition, U.S. Pat. No. 3,041,167 discloses an overcoated imaging member containing a conductive substrate, a photoconductive layer, and an overcoating layer of an electrically insulating polymeric material. This member can be employed in electrophotographic imaging processes by initially charging the member with an electrostatic charge of a first polarity, followed by exposing it to form an electrostatic latent image that can subsequently be developed to form a visible image. Composite electrophotographic photosensitive materials containing various azo compounds are disclosed in U.S. Pat. No. 4,618,672, wherein bisazo compounds particularly suitable for use in the charge generating layer of a layered electrophotographic photoconductor are illustrated. Similarly, an article by M. Hashimoto entitled "Electrophotographic Sensitivity of Fluorenone Bisazo Pigments", *Electrophotography*, Vol. 25, No. 3 (1986), discloses disazo compounds as charge generating materials in electrophotographic layered photoreceptors. Further, Japanese Patent Kokai No. 54-20736 discloses disazo pigments as constituents in electrophotographic processes. Japanese Patent 58-177955 also discloses many disazo compounds suitable for use in the photosensitive layer of an electrophotographic device.

U.S. Pat. No. 4,713,307, the disclosure of which is hereby totally incorporated by reference, also discloses photoconductive imaging members containing a supporting substrate, certain azo pigments as photogenerating materials, and a hole transport layer that preferably contains an aryl amine compound dispersed in an inactive resinous binder.

U.S. Pat. No. 4,797,337, the disclosure of which is totally incorporated herein by reference, discloses a photoconductive imaging member comprising a supporting substrate, a hole transport layer, and a photogenerating layer comprising specific disazo compounds.

U.S. Pat. No. 4,755,443 discloses a photoreceptor for electrophotography which comprises a charge carrier generating material and charge transport material wherein one charge generating material is a metal phthalocyanine or a metal free phthalocyanine. Other carrier generating substances can be used in combination with the phthalocyanine generator material, including azo pigments, anthraquinone dyes, perylene dyes, polycyclic quinone dyes, and methine stearate pigments.

U.S. Pat. No. 4,424,266 discloses an electrophotographic photosensitive element having a conductive support and a photosensitive layer comprising a carrier generating phase layer containing a carrier generating material selected from the group consisting of perylene dyes, polycyclic quinones, and azo dyes, and a carrier transporting phase layer containing a hydrazone carrier transporting material. The carrier generator materials can be used either singly or in combination.

Illustrated in copending patent application U.S. Ser. No. 709,734, the disclosure of which is totally incorporated herein by reference, are developer compositions and toner compositions comprised of resin particles, and pigment particles comprised of fullerenes, a new third form of carbon also referred to as buckminsterfullerene or buckyballs, other forms of fullerenes illustrated therein, and other known fullerenes. More specifically, the copending patent application discloses toner compositions comprised of resin particles, and pigment particles comprised of fullerenes, a third form of carbon, described as being comprised of 60 atom clusters of carbon arranged at the verticies of a truncated icosahedron and resembling miniature soccer balls. Such a structure resembles the geodesic domes designed by R. Buckminister Fuller, Jr., the namesake of these molecular structures. In one embodiment of the copending application, there are provided toner compositions comprised of resin particles, pigment particles, and fullerenes as charge additives. Also, in another embodiment of the copending application there are provided colored toner compositions comprised of known toner resin particles, fullerene pigment particles, and pigment particles comprised of cyan, magenta, yellow, red, green, blue, brown, or mixtures thereof.

Reference to fullerenes includes all forms of the fullerenes illustrated herein, other known fullerenes, mixtures thereof in embodiments, and the like.

SUMMARY OF THE INVENTION

It is an object of the present invention to provide imaging members which possess a number of advantages.

In another object of the present invention there are provided imaging members comprised of a third form of carbon, referred to as a fullerene, a form of $C_{60}$ carbon, or a mixture of $C_{60}$ with other fullerenes.

Furthermore, another object of the present invention resides in the provision of positively charged, or negatively charged layered imaging members with fullerenes.

Additionally, in yet another object of the present invention there are provided layered imaging members with charge transport layers comprised of fullerenes, including fullerenes dispersed and/or dissolved in polymer matrices, and wherein there are enabled images of excellent quality inclusive of acceptable resolutions.

In another object of the present invention there are provided layered imaging members with known charge transport layers and a photogenerating layer comprised of fullerenes, and wherein there are enabled images of excellent quality inclusive of acceptable resolutions.

Moreover, in another object of the present invention there are provided layered imaging members with high molecular weight fullerenes, such as $C_{234}$, $C_{340}$, or mixtures thereof.

Another object of the present invention resides in the provision of layered imaging members with derivatized fullerenes containing various groups, such as alkyls, of, for example, from 1 to about 25 carbon atoms, like methyl, ethyl, propyl, butyl, pentyl, heptyl, hexyl, and the like; aryls with, for example, from 6 to about 24 carbon atoms like phenyl, naphthyl, and the like; ethylene diamine; hydroxy; carboxy; carbonyl; amino; amido; osmylato; oxo dioxo; keto; mercapto; alkoxy, such as methoxy, and the like; imino; allyl; ethynyl; azo; nitroso; formyl; halo, such as chloro; cyano, carboxamido; alkoxycarbonyl; nitro; vinyl; peroxy; and the like, which groups can be appended via chemical bonding to the fullerene cage, reference for example *The Journal of Organic Chemistry*, 1990, Volume 55, pages 6250 to 6252, the disclosure of this article being totally incorporated herein by reference. Furthermore, imaging members with fullerenes that contain noncarbon atoms in the cage are envisioned. These fullerenes can be derived from an all carbon fullerene wherein, one, two, three, four, or more carbon atoms comprising the framework are replaced with known noncarbon atoms, such as boron. Also, imaging members comprised of fullerenes with an atom, or atoms other than carbon inside the cage, such as any atom, or atoms of the known Periodic Table, the disclosure of which is totally incorporated herein by reference, such as calcium, sodium, potassium, silicon, copper, selenium, lanthanum, chlorine, iron, and the like can be trapped inside the spheroidal cluster of carbon atoms.

It is still another object of the present invention to provide imaging members with fullerenes, or a fullerene with a molecular weight of from about 384 to about 12,000.

These and other objects of the present invention can be accomplished by providing imaging members comprised of fullerenes, a new third form of carbon also referred to as buckminsterfullerene or buckyballs, other forms of fullerenes illustrated herein, and other known fullerenes. More specifically, the present invention is directed to layered imaging members comprised of a supporting substrate, in contact therewith a photogenerating layer, and in contact with the photogenerating layer a charge transport layer comprised of fullerenes, a third form of carbon described as being comprised of 60 atom clusters of carbon arranged at the verticies of a truncated icosahedron and resembling miniature soccer balls. Such a structure resembles the geodesic domes designed by R. Buckminister Fuller, Jr., the namesake of these molecular structures. In one embodiment of the present invention, there is provided a layered imaging member comprised of a supporting substrate, in contact therewith a photogenerating layer, and in contact with the photogenerating layer a charge transport layer comprised of a fullerene dispersed in a resin binder. Reference to fullerenes includes all forms of the fullerenes illustrated herein, other known fullerenes, mixtures thereof in embodiments, and the like.

Embodiments of the present invention include an imaging member comprised of a supporting substrate, a photogenerator layer optionally dispersed in a resin binder, and a charge transport layer comprised of a fullerene or fullerenes optionally dispersed in a resin binder; a layered imaging member wherein the photogenerating pigment is a single, vacuum-sublimed layer comprised of a fullerene, comprised of $C_{60}$ carbon, $C_{70}$ carbon, $C_{84}$ carbon, $C_{234}$ carbon, $C_{340}$ carbon, or mixtures thereof; an imaging member comprised of a supporting substrate, a photogenerator layer comprised of a fullerene or fullerenes, and a charge transport layer; a photoconductive imaging member comprised of a fullerene; a photoconductive imaging member comprised of a supporting substrate, a photogenerator layer comprised of a fullerene dispersed in a resin binder, and a charge transport layer dispersed in a resin binder; a single layered photoconductive imaging member comprised of a fullerene contained on a supporting substrate, and wherein the fullerene functions both as a photogenerator, and a charge transport; an imaging member comprised in the order stated of a supporting substrate, such as a polyamide, about 100 mils thick, an adhesive layer, like a polyester, with a thickness of from about 0.1 to about 5 microns, a hole blocking layer, such as polyvinylbutyral, from about 0.1 to about 5 microns thick, a photogenerator layer optionally dispersed in a resin binder, and a charge transport layer comprised of a fullerene or fullerenes optionally dispersed in a resin binder, and with an optional protective overcoating layer, such as a polymer, like a polysilicate; and methods of imaging which comprise generating an electrostatic latent image on the imaging member of the present invention, developing the latent image, and transferring the developed electrostatic image to a suitable substrate.

The supporting substrate can be formulated entirely of an electrically conductive material, or it can be an insulating material having an electrically conductive surface. The substrate is of an effective thickness, generally up to about 100 mils, and preferably from about 1 to about 50 mils (throughout, unless noted otherwise, about to about includes values in between), although the thickness can be outside of this range. The thickness of the substrate layer depends on many factors, including economic and mechanical considerations. Thus, this layer may be of substantial thickness, for example over 100 mils, or of minimal thickness provided that there are no adverse effects on the device. In an embodiment, the thickness of this layer is from about 3 mils to about 10 mils. The substrate can be opaque or substantially transparent and can comprise numerous suitable materials having the desired mechanical properties. The entire substrate can comprise the same material as that in the electrically conductive surface or the electrically conductive surface can merely be a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, titanium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate layer can vary in thickness over substantially wide ranges depending on the desired use of the electrophotoconductive member. Generally, the conductive layer ranges in thickness of from about 50 Angstroms to 5,000 Angstroms, although the thickness can be outside of this range. When a flexible electrophotographic imaging member is desired, the substrate thickness typically is from about 100 Angstroms to about 750 Angstroms. Also, in embodiments the substrate can be comprised of any known conventional material, including organic and inorganic materials. Specific substrate materials include insulating nonconducting materials such as various resins known for this purpose including polycarbonates, polyamides, polyurethanes, paper, glass, plastic, polyesters, such as MYLAR ® (available from E. I. DuPont) or MELINEX 447 ® (available from ICI Americas, Inc.), and the like. If desired, a conductive substrate can be coated onto an insulating material. In addition, the substrate can comprise a metallized plastic, such as titanized or aluminized MYLAR ®, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate preferably comprises a metal oxide such as aluminum oxide, nickel oxide, titanium oxide, and the like.

In embodiments, intermediate adhesive layers situated between the substrate and subsequently applied layers may be desirable to improve adhesion. If such adhesive layers are utilized, they preferably have a dry thickness of from about 0.1 micron to about 5 microns, although the thickness can be outside of this range. Typical adhesive layers include film-forming polymers such as polyester, polyvinylbutyral, polyvinylpyrrolidone, polycarbonate, polyurethane, polymethyl methacrylate, and the like as well as mixtures thereof. Since the surface of the substrate can be a metal oxide layer or an adhesive layer, the expression "substrate" as employed herein is intended to include in embodiments a metal oxide layer with or without an adhesive layer on the metal oxide layer.

The photogenerating layer comprises known components such as organic and inorganic materials like metal phthalocyanines, metal free phthalocyanines, titanyl phthalocyanines, vanadyl phthalocyanines, squaraines, bisazos, azos, perylenes, selenium, selenium alloys, such as selenium tellurium, hydrogenated amorphous silicon, and the like. Generally, this layer has a thickness of from about 0.05 micron to about 10 microns or more, and in embodiments has a thickness of from between about 0.1 micron to about 3 microns. The thickness of this layer, however, is dependent primarily upon the concentration of photogenerating material in the layer, which may generally vary from about 5 to 100 percent. When the photogenerating material is present in a binder material, the binder preferably contains from about 30 to about 95 percent by weight of the photogenerating material, and preferably contains about 80 percent by weight of the photogenerating material. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, such as the specific photogenerating compound selected, the thickness of the other layers, and whether a flexible photoconductive imaging member is desired.

Figure 1:
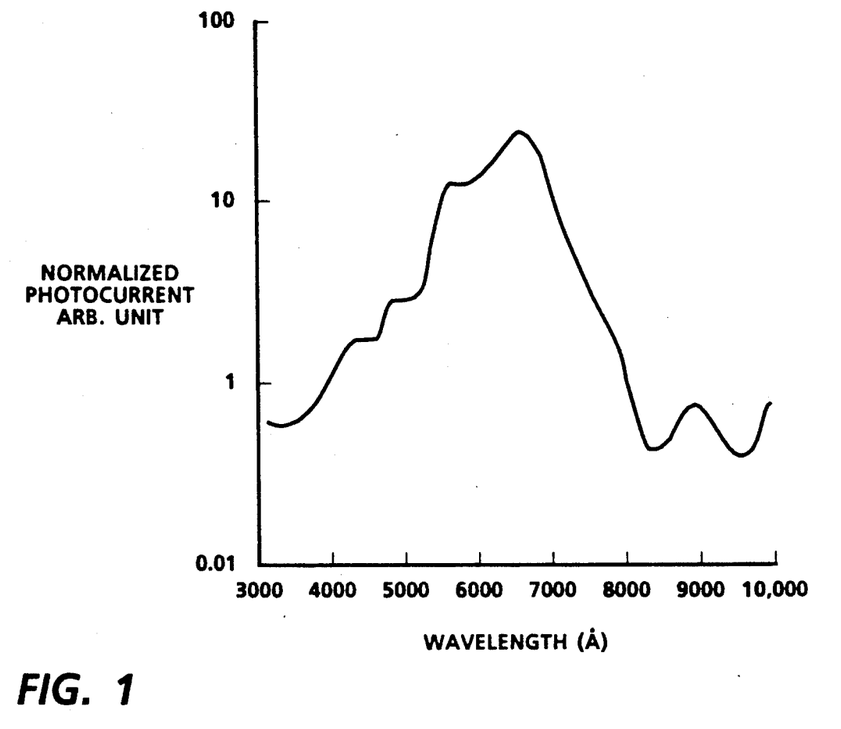
FIG. 1 illustrates the photocurrents for a $C_{60/70}$ film as a function of the wavelength of light.

Also the photogenerating pigment can be comprised of the fullerenes, preferably when the charge transport is not a fullerene. The spectral response of a 1.5 micron layer of vacuum sublimed $C_{60/70}$ is illustrated in FIG. 1. FIG. 1 shows the photocurrents in arbitrary units (ordinate) measured on a 1.5 micron layer of vacuum sublimed $C_{60/70}$ sandwiched between two metal electrodes as a function of the wavelength of light (abscissa); the data are normalized for any variation in the intensity of the light source. The photoresponse shows a threshold at 8,550 Å and peaks between 6,500 and 7,500 Å. The photocurrents were stable over a period of at least 600 minutes with an electric field of $2 \times 10^4$ volts/centimeter applied. This implies that the $\mu\tau$ product is $\geq 10^{-8}$ cm$^2$/volt which is sufficient to produce photodischarge of the imaging member.

The charge transport molecules for the charge transport layer can be comprised of the fullerenes illustrated, a new form of carbon as illustrated herein, and as obtained from the sources mentioned herein. The aforementioned fullerenes are believed to be comprised mainly of $C_{60}$ but contain some $C_{70}$ carbon as well and probably small amounts of higher molecular weight fullerenes. As charge transport components, the fullerenes are present in various effective amounts, such as for example from about 30 to 95, preferably from about 40 to 60, and more preferably from about 30 to about 60 weight percent in a resin binder. High molecular weight fullerenes, such as $C_{234}$, $C_{340}$, and the like may also be selected. The charge transport layer can be of various effective thicknesses such as, for example, from about 25 to about 200, and preferably from about 40 to about 75 microns. The charge transport molecules may also be comprised of a mixture, in effective amounts, of the fullerenes or a mixture of fullerenes. Additionally, homogeneous single fullerene photogenerator or transport layers may be employed.

Examples of the highly insulating and transparent resinous components or inactive binder resinous material for the transport layer include materials such as those described in U.S. Pat. No. 3,121,006, the disclosure of which is totally incorporated herein by reference. Specific examples of suitable organic resinous materials include polycarbonates, arcylate polymers, vinyl polymers, cellulose polymers, polyesters, polysiloxanes, polyamides, polyurethanes, polystyrenes, and epoxies as well as block, random or alternating copolymers thereof. In embodiments, specific electrically inactive binder materials include polycarbonate resins having a molecular weight of from about 20,000 to about 100,000 with a molecular weight in the range of from about 50,000 to about 100,000 being particularly preferred. Generally, the resinous binder contains from about 5 to about 90 percent by weight of the active material, and preferably from about 20 percent to about 75 percent of this material.

Similar binder materials may be selected for the photogenerating layer, including polyesters, polyvinyl butyrals, polyvinylcarbazole, polycarbonates, MAKROLON®, polyvinyl formals, poly(vinylacetals) and those illustrated in U.S. Pat. No. 3,121,006, the disclosure of which is totally incorporated herein by reference.

The photoconductive imaging member may optionally contain a charge blocking layer situated, for example, between the conductive substrate and the photogenerating layer. This layer may comprise metal oxides, such as aluminum oxide and the like, or materials such as silanes and nylons. Additional examples of suitable materials include polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures thereof, copolymers thereof, and the like. The primary purpose of this layer is to prevent charge injection from the substrate during and after charging. This layer is of a thickness of less than 50 Angstroms to about 10 microns, and preferably is no more than about 2 microns in thickness.

The present invention also encompasses a method of generating images with the photoconductive imaging members disclosed herein. The method comprises the steps of generating an electrostatic latent image on a photoconductive imaging member of the present invention, developing the latent image, and transferring the developed electrostatic image to a substrate. Optionally, the transferred image can be permanently affixed to the substrate. Development of the image may be achieved by a number of methods, such as cascade, touchdown, powder cloud, magnetic brush, and the like. Transfer of the developed image to a substrate may be by any method, including those making use of a corotron or a biased roll. The fixing step may be performed by means of any suitable method, such as flash fusing, heat fusing, pressure fusing, vapor fusing, and the like. Any material used in xerographic copiers and printers may be used as a substrate, such as paper, transparency material, or the like. Development can be accomplished with known toners and developers such as those illustrated, for example, in a number of U.S. Pat. Nos. 4,560,635, 4,298,672 and 4,338,390, the disclosures of which are totally incorporated herein by reference, such as a toner comprised of a styrene acrylate, a styrene methacrylate, a styrene butadiene, pigment particles such as carbon black, like REGAL 330®, magnetites, and the like, including cyan, magenta, and yellow as well as mixtures thereof, and a charge additive such as distearyl dimethylammonium methyl sulfate.

BRIEF DESCRIPTION OF THE FIGURES

Embodiments of the present invention and information relating thereto are presented in the following figures wherein.

DETAILED DESCRIPTION OF THE FIGURES

FIG. 1 illustrates the photosensitivity, in arbitrary units, (the ordinate), which is the measured photocurrent divided by the light intensity striking the sample at each wavelength in a 1.5 micron thick vacuum-sublimed $C_{60/70}$ film as indicated herein. The data are normalized for any variation in the intensity of the light source and are measured at room temperature on a 1.5 micron layer of vacuum-sublimed $C_{60/70}$ sandwiched between two aluminum metal electrodes. The abscissa indicates the wavelength of the incident light. It can be determined from this figure that the photosensitivity at 6,500 Angstroms is almost two orders of magnitude higher than that at 8,000 Angstroms.

Figure 2:
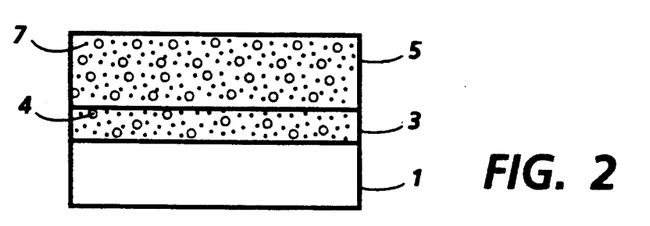
FIGS. 2, 3 and 4 represent schematic cross-sectional views of examples of the photoconductive imaging members of the present invention.

FIG. 2 illustrates schematically one embodiment of the imaging members of the present invention. Specifically, FIG. 2 illustrates a photoconductive imaging member comprising a conductive substrate 1, a photogenerating layer 3 comprised of trigonal selenium, vanadyl phthalocyanine, and the like, optionally dispersed in a resinous binder composition 4, and a charge, especially hole, transport layer 5, which comprises charge transporting components comprised of a fullerene or the fullerenes illustrated herein, such as $C_{60}$ dispersed in an inactive resinous binder composition 7. A variety of binder materials may be selected for the photogenerating and transport layers, including polyesters, polyvinyl butyrals, polyvinylcarbazole, polycarbonates, MAKROLON®, polyvinyl formals, poly(vinylacetals) with a preferred binder being a polycarbonate. The photogenerating layer has a thickness of from about 0.05 micron to about 10 microns or more, and in embodiments has a thickness of from between about 0.1 micron to about 3 microns. The thickness of this layer, however, is dependent primarily upon the concentration of photogenerating material in the layer, which may generally vary from about 5 to 100 percent. When the photogenerating material is present in a binder material, the binder preferably contains from about 30 to about 95 percent by weight of the photogenerating material, and solid fullerenes are present in various effective amounts, such as for example from about 30 to 95, and more specifically from about 30 to about 40 weight percent in a resin binder. The charge transport layer can be of various effective thicknesses, such as for example from about 10 to about 200, and more specifically from 20 to 30 microns. The charge transport molecules may also be comprised of a mixture, in effective amounts, of the fullerenes. Alternatively, a single, 20 microns thick or other effective thickness, homogeneous vacuum-sublimed layer of $C_{60}$ may be employed, thus eliminating the need for an inactive resinous binder.

Figure 3:
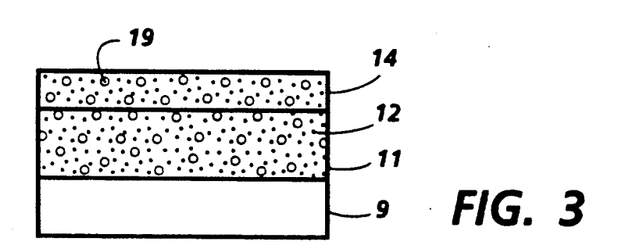

FIG. 3 illustrates schematically essentially the same member as that shown in FIG. 2 with the exception that the transport layer is situated between the conductive substrate and the photogenerating layer. More specifically, this Figure illustrates a photoconductive imaging member comprising a conductive substrate 9, a hole transport layer 11 which comprises charge transporting components comprised of the fullerenes illustrated herein, such as $C_{60}$ or $C_{84}$, dispersed in an inactive resinous binder composition 12, and the photogenerating layer 14 optionally dispersed in a resinous binder composition 19.

Figure 4:
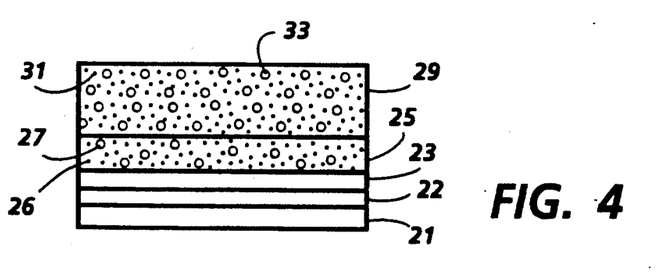

FIG. 4 illustrates schematically a photoconductive imaging member of the present invention comprising a conductive substrate 21, a hole blocking metal oxide layer 22, such as 50 Angstroms of aluminum oxide, an optional adhesive layer 23, such as 1 micron of polycarbonate, a photogenerating layer 25, 2 microns thick, comprised of a metal phthalocyanine, a metal free phthalocyanine, vanadyl phthalocyanine, titanyl phthalocyanine, especially Type IV, or mixtures thereof 26 optionally dispersed in a resinous binder composition 27, 30 percent by weight, and a charge transport layer 29, 20 microns thick, which comprises charge transporting components comprised of the fullerenes such as $C_{60}$ illustrated herein 31, dispersed in an inactive resinous binder 33 in an amount of 30 percent by weight composition. A single, 20 microns thick, homogeneous vacuum-sublimed layer of $C_{60}$ may be employed, thus eliminating the need for an inactive resinous binder.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

There can be prepared a layered photoconductive imaging member as illustrated in FIG. 2, for example, by the following process.

The fullerenes, obtainable, for example, from Texas Fullerenes Corporation, 2415 Shakespeare Suite 5, Houston, Tex. 77030-1038, are believed to be comprised of mainly $C_{60}$ and smaller amounts of $C_{70}$ and $C_{84}$ carbon molecules, and possibly small amounts of other higher molecular weight fullerenes. The photogeneration layer, about 1.0 micron thick, is prepared by first dissolving in a 1 ounce brown bottle 600 milligrams of the above obtained fullerene powder, and 600 milligrams of polycarbonate MAKROLON ® in 10 milliliters of toluene. The bottle is then placed on a Red Devil Paint Conditioner (Model 5100X) and shaken for about 60 minutes. The resulting dispersion is coated onto a 1 inch by 1 inch aluminum substrate, 1/16 inch thick, by spin coating using a photoresist spin coater, Headway Research Inc. Garland, Tex. spinning at about 1,000 rpm for 30 seconds. The resulting carrier photogenerator layer, 1 micron thick, is air dried for about 30 minutes and then vacuum dried for about 1 hour at 100° C.

The above photogenerator layer is overcoated with a hole transport layer comprised of 60 weight percent of the polycarbonate MAKROLON ® obtained from Larkensabricken Bayer AG, and 40 percent of aryl diamine hole transport molecules prepared as follows. A solution containing 4.2 grams of MAKROLON ®, a polycarbonate resin obtained from Larbensabricken Bayer A.G., 2.8 grams of N,N'-bis(3"-methylphenyl)-1,1'-biphenyl-4,4'-diamine, reference for example U.S. Pat. No. 4,265,990, the disclosure of which is totally incorporated herein by reference, was prepared by dissolving the above materials in 31 milliliters of methylene chloride inside a 2 ounce amber bottle. The transport layer is obtained by coating the solution onto the above prepared charge generator layer using a 3.5 inch wide, 5 mil wet gap, Bird Film Applicator resulting in a transport layer about 27 microns thick. The resulting photoconductive member is air dried for about 1 hour and vacuum dried at 100° C. for about 16 hours.

It is believed that images can be developed on the above imaging member with a known toner comprised of a styrene butadiene resin (91/9), 88 weight percent, carbon black REGAL 330 ®, 10 weight percent, and 2 weight percent of the charge additive distearyl dimethyl ammonium methyl sulfate, thereafter transferring the developed image to a paper substrate, and fusing with heat.

EXAMPLE II

The fullerenes, obtainable, for example, from Texas Fullerenes Corporation, 2415 Shakespeare Suite 5, Houston, Tex. 77030-1038, and believed to be comprised of mainly $C_{60}$ and smaller amounts of $C_{70}$ and $C_{84}$ carbon molecules, and possible small amounts of other higher molecular weight fullerenes can be purified by column chromatography. In this manner pure, about 99.5 percent, $C_{60}$ can be obtained. The photogeneration layer, about 1.0 micron thick, is prepared by first dissolving in a 1 ounce brown bottle, 600 milligrams of the above prepared pure $C_{60}$ powder, and 600 milligrams of polycarbonate MAKROLON ® in 10 milliliters of toluene. The bottle is then placed on a Red Devil Paint Conditioner (Model 5100X) and shaken for about 60 minutes. The resulting dispersion is coated onto a 1 inch by 1 inch aluminum, 1/16 inch thick, substrate by a photoresist spin coater, available from Headway Research Inc., Garland, Tex., spinning at about 1,000 rpm for 30 seconds. The resulting carrier photogenerator layer, 1 micron thick, is air dried for about 30 minutes and then vacuum dried for about 1 hour at 100° C.

The above photogenerator layer is overcoated with a hole transport layer comprised of 60 weight percent of the polycarbonate MAKROLON ® obtained from Larkensabricken Bayer AG, and 40 percent of aryl diamine hole transport molecules prepared as follows. A solution containing 4.2 grams of MAKROLON ®, a polycarbonate resin obtained from Larbensabricken Bayer A.G., 2.8 grams of N,N'-bis(3"-methylphenyl)-1,1'-biphenyl-4,4'-diamine, reference U.S. Pat. No. 4,265,990, the disclosure of which is totally incorporated herein by reference, was prepared by dissolving the above materials in 31 milliliters of methylene chloride inside a 2 ounce amber bottle. The transport layer is obtained by coating the solution onto the charge generator layer using a 3.5 inch wide, 5 mil wet gap, Bird Film Applicator resulting in a transport layer about 27 microns thick. The resulting photoconductive member is air dried for about 1 hour and vacuum dried at 100° C. for about 16 hours. Images can be obtained by repeating the process of Example I.

EXAMPLE III

There is prepared a layered photoconductive imaging member containing the photogenerating pigment 2,7-bis(1'-azo-2'-hydroxy-8'-chloro-11'H-benzo(a)carbazole-3'-carboxy-p-fluoroanilide)fluorenone.

The photogenerating pigment dispersion is prepared by first dissolving in a 1 ounce brown bottle 52.8 milligrams of polyvinyl formal (obtained from Scientific Polymer Products, Inc., formal content 82 percent, acetate content 12 percent, hydroxy content 6 percent) and 10 milliliters of tetrahydrofuran. To the bottle are then added 211.2 milligrams of the above bisazo pigment 2,7-bis(1'-azo-2'-hydroxy-8'-chloro-11'H-benzo(a)carbazole-3'-carboxy-p-fluoroanilide)fluorenone and about 90 grams of steel shot (⅛ inch diameter, number 302 stainless steel shot). The bottle is then placed on a Red Devil Paint Conditioner (Model 5100X) and shaken for about 30 minutes. The resulting dispersion is coated onto a 1 inch by 1 inch brush-grained aluminum substrate, 1/16 inch thick, obtained from Ron Ink Company using a Gardner Mechanical Drive with a 6 inch wide Bird Film Applicator (0.5 mil wet gap) inside a humidity controlled glove box. The relative humidity of the glove box is controlled by dry air to about 25 percent, or less. The resulting carrier photogenerator layer is air dried for about 30 minutes and then vacuum dried for about 1 hour at 100° C. The thickness of the charge generator layer is about 0.5 micron.

The above charge generator layer is overcoated with a transport layer comprised of 60 weight percent of the fullerenes obtainable from Texas Fullerenes Corporation, 2415 Shakespeare Suite 5, Houston, Tex. 77030-1038, which are believed to be comprised of mainly $C_{60}$ and smaller amounts of $C_{70}$ and $C_{84}$ carbon molecules, and possible small amounts of other higher molecular weight fullerenes. The charge transport layer, about 20.0 micron thick, is prepared by first dissolving in a 1 ounce brown bottle 600 milligrams of the fullerene powder, and 600 milligrams of polycarbonate MAKROLON ® in 10 milliliters of toluene. The bottle is then placed on a Red Devil Paint Conditioner (Model 5100X) and shaken for about 60 minutes. The resulting dispersion is then coated onto the photogenerating layer. The resulting transport layer is air dried for about 30 minutes and then vacuum dried for about 1 hour at 100° C.

EXAMPLE IV

There can be prepared a photoconductive imaging member as a homogeneous vacuum-sublimed film of fullerenes. The fullerene powder is placed in evaporation boats or crucibles made of tungsten or tantalum situated 15 centimeters below aluminum substrates, all of which are situated within a vacuum chamber. The vacuum chamber is then evacuated to a pressure of $10^{-5}$ Torr or lower. The crucibles are heated by passage of an electrical current. First, the crucibles are heated to 450° C. to drive off residual solvents and volatile impurities, during which time the substrates are shielded by rotatable masks. The masks are then adjusted to expose the substrates to the crucibles and the electric current through them increased so that the temperature rises to 500° C. at which time the fullerenes are driven off and condense on the substrates. Typical deposition rates are about 1 micron per minute. Depending on the amount of fullerenes loaded into the crucible and the evaporation time, a 1 to 2 micron thick photogeneration layer or a 20 to 30 micron charge transport layer may be produced. The aforementioned evaporated product may be used together with the photogenerator layer as described in Example III. Alternatively, the 20 to 30 micron fullerene layer may be used as a single layer imaging member in which the photogeneration and charge transport functions are combined.

Other modifications of the present invention may occur to those skilled in the art subsequent to a review of the present application. The aforementioned modifications, including equivalents thereof, are intended to be included within the scope of the present invention.

What is claimed is:

1. An imaging member comprised of a supporting substrate, a photogenerator layer optionally dispersed in a resin binder, and a charge transport layer comprised of a fullerene of a mixture of $C_{60}$ and $C_{70}$ carbon, or a mixture of $C_{60}$, $C_{70}$ and $C_{84}$ carbon optionally dispersed in a resin binder.
2. An imaging member in accordance with claim 1 wherein the fullerene is comprised of a mixture of $C_{70}$ and $C_{60}$ carbon.
3. An imaging member in accordance with claim 1 wherein the fullerenes are comprised of a mixture of $C_{70}$ and $C_{60}$ carbon in the configuration of a soccer ball.
4. An imaging member in accordance with claim 1 wherein the photogenerating layer is situated between the supporting substrate and the charge transport layer.
5. An imaging member in accordance with claim 1 wherein the charge transport layer is situated between the supporting substrate and the photogenerating layer.
6. An imaging member in accordance with claim 1 wherein the supporting substrate is comprised of a conductive component comprised of a metal.
7. An imaging member in accordance with claim 6 wherein the conductive substrate is aluminum.
8. An imaging member in accordance with claim 1 wherein the photogenerator layer has a thickness of from between about 0.05 to about 10 microns.
9. An imaging member in accordance with claim 2 wherein the photogenerator layer has a thickness of from between about 0.05 to about 10 microns.
10. An imaging member in accordance with claim 1 wherein the photogenerating layer is comprised of a photogenerating pigment dispersed in a resinous binder in an amount of from about 5 percent by weight to about 95 percent by weight.
11. An imaging member in accordance with claim 3 wherein the photogenerating pigment is dispersed in a resinous binder in an amount of from between about 5 percent by weight to about 95 percent by weight.
12. An imaging member in accordance with claim 1 wherein the resinous binder is selected from the group consisting of polyesters, polyvinyl butyrals, polycarbonates, and polyvinyl formals.
13. An imaging member in accordance with claim 10 wherein the resinous binder is selected from the group consisting of polyesters, polyvinyl butyrals, polycarbonates, and polyvinyl formals.
14. An imaging member comprised of a supporting substrate, a photogenerator layer comprised of a fullerene, a combination of $C_{60}$ and $C_{70}$ carbon or a combination of $C_{60}$, $C_{70}$ and $C_{84}$ carbon, and a charge transport layer.
15. An imaging member in accordance with claim 14 wherein the charge transport layer comprises aryl amines.
16. An imaging member in accordance with claim 15 wherein the aryl amine is of the formula wherein X is selected from the group consisting of alkyl and halogen and wherein the aryl amine is dispersed in a highly insulating and transparent organic resinous binder.

17. An imaging member in accordance with claim 16 wherein alkyl contains from about 1 to about 25 carbon atoms.

18. An imaging member in accordance with claim 16 wherein halogen is chloride.

19. An imaging member in accordance with claim 14 wherein the photogenerating layer is comprised of a combination of $C_{70}$ carbon and $C_{60}$ carbon in the configuration of a soccer ball.

20. An imaging member in accordance with claim 15 wherein the photogenerating layer is comprised of a mixture of $C_{60}$ carbon, and $C_{70}$ carbon.

21. A method of imaging which comprises generating an electrostatic latent image on the imaging member of claim 1, developing the latent image, and transferring the developed electrostatic image to a suitable substrate.

22. A method of imaging which comprises generating an electrostatic latent image on the imaging member of claim 2, developing the latent image, and transferring the developed electrostatic image to a suitable substrate.

23. A method of imaging which comprises generating an electrostatic latent image on the imaging member of claim 3, developing the latent image, and transferring the developed electrostatic image to a suitable substrate.

24. An imaging member in accordance with claim 1 sensitive to light of a wavelength of from about 400 to about 800 nanometers.

25. An imaging member in accordance with claim 2 sensitive to light of a wavelength of from about 400 to about 800 nanometers.

26. An imaging member in accordance with claim 1 wherein the photogenerating layer is comprised of a metal phthalocyanine, a metal free phthalocyanine, titanyl phthalocyanine, or vanadyl phthalocyanine.

27. An imaging member in accordance with claim 1 wherein the photogenerating layer is comprised of selenium, or a selenium alloy.

28. A photoconductive imaging member comprised of a fullerene of a mixture of $C_{60}$ carbon and $C_{70}$ carbon, or a mixture of $C_{60}$ carbon, $C_{70}$ and $C_{84}$ carbon.

29. An imaging member in accordance with claim 28 wherein the fullerene is comprised of a mixture of $C_{60}$ carbon and $C_{70}$ carbon.

30. An imaging member in accordance with claim 28 wherein the fullerene is comprised of a combination of $C_{70}$ and $C_{60}$ carbon in the configuration of a soccer ball.

31. A photoconductive imaging member comprised of a supporting substrate, a photogenerator layer comprised of a fullerene of a mixture of $C_{60}$ and $C_{70}$ carbon, or a mixture of $C_{60}$, $C_{70}$ and $C_{84}$ carbon dispersed in a resin binder, and a charge transport layer dispersed in a resin binder.

32. A single layered photoconductive imaging member comprised of a fullerene contained on a supporting substrate, and wherein the fullerene of a mixture of $C_{60}$ and $C_{70}$ carbon, or a mixture of $C_{60}$, $C_{70}$ and $C_{84}$ carbon functions both as a photogenerator and a charge transport.

33. An imaging member comprised in the order stated of a supporting substrate, an adhesive layer, a hole blocking layer, a photogenerator layer optionally dispersed in a resin binder, and a charge transport layer comprised of a fullerene of a mixture of $C_{60}$ and $C_{70}$ carbon, or a mixture of $C_{60}$, $C_{70}$ and $C_{84}$ carbon optionally dispersed in a resin binder.

34. An imaging member in accordance with claim 33 wherein the substrate is a polyamide about 100 mils thick.

35. An imaging member in accordance with claim 33 with a protective polymeric overcoating.

36. An imaging member in accordance with claim 35 wherein the overcoating is from between about 0.1 to 5 microns in thickness.

* * * * *